United States Patent [19]

Saunders

[11] 4,020,592

[45] May 3, 1977

[54] COMBINED PLANTER RECEPTACLE AND PLANT SUPPORT

[75] Inventor: Carl A. Saunders, Fort Madison, Iowa

[73] Assignee: Cardic and Company, Fort Madison, Iowa

[22] Filed: Jan. 8, 1976

[21] Appl. No.: 647,570

[52] U.S. Cl. .................................... 47/71; 47/47
[51] Int. Cl.² ...................... A01G 9/04; A01G 9/12
[58] Field of Search ................ 47/44, 46, 47, 48.5, 47/38, 38.1, 34 R, 34 S, 34 A

[56] References Cited

UNITED STATES PATENTS

| 296,028 | 4/1884 | Martin | 47/34.1 |
|---|---|---|---|
| 2,120,599 | 6/1938 | Brown | 47/34.2 |
| 2,691,245 | 10/1954 | Yohe | 47/38.1 |
| 3,381,410 | 5/1968 | Potain | 47/38 |
| 3,739,523 | 6/1973 | Tuffli | 47/38.1 |

FOREIGN PATENTS OR APPLICATIONS

| 1,581,467 | 9/1969 | France | 47/38.1 |
|---|---|---|---|
| 183,168 | 4/1907 | Germany | 47/38.1 |
| 123,853 | 3/1919 | United Kingdom | 47/34.2 |
| 268,946 | 4/1927 | United Kingdom | 47/47 |
| 2,055 | 1/1913 | United Kingdom | 47/47 |

*Primary Examiner*—Edgar S. Burr
*Assistant Examiner*—Steven A. Bratlie
*Attorney, Agent, or Firm*—Thomas E. Frantz

[57] ABSTRACT

A dish-shaped base is placed under and forms a reservoir for receiving excess liquid from a planter of the type having a centrally located bottom drain. The base includes a centrally disposed socket which projects into the drain to center the planter and base, and a plurality of ribs radiating outwardly from the socket and forming a seat to support the planter in a spaced relation with the bottom wall of the base. In addition to forming a seat for the planter, the ribs simultaneously reinforce the base and buttress the socket. An elongate, rod-like plant support of manually variable length is adapted for insertion vertically through the soil within the planter and into releasable engagement with the socket; the socket restraining the plant support against tilting under the influence of transversely applied pressure, as when a plant or branch is tied thereto.

6 Claims, 4 Drawing Figures

U.S. Patent       May 3, 1977       4,020,592
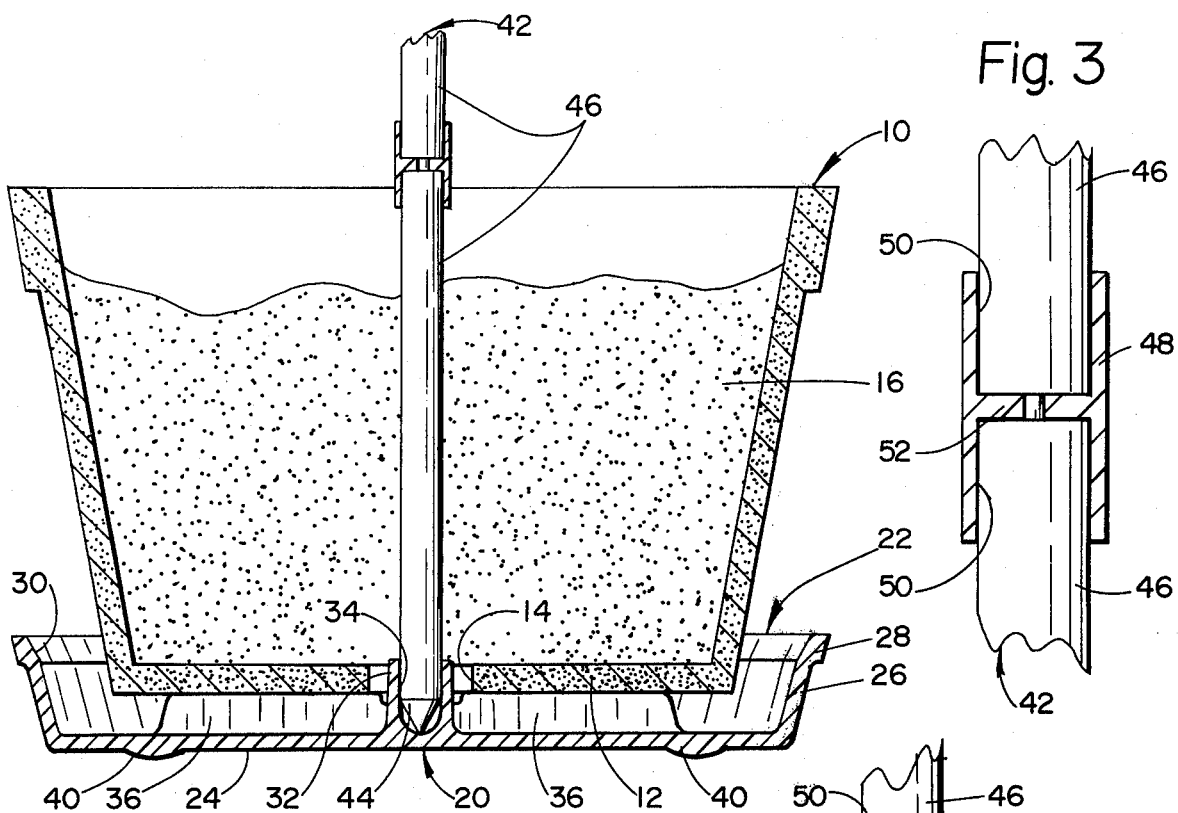
Fig. 3
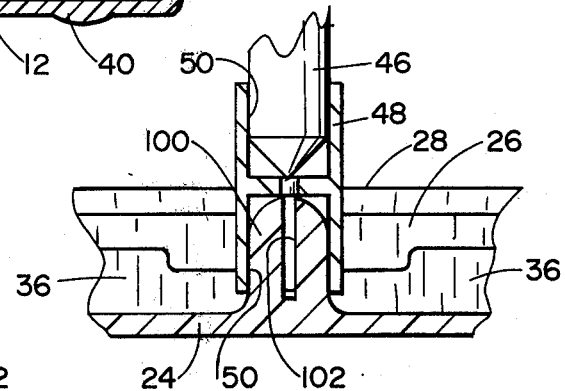
Fig. 4
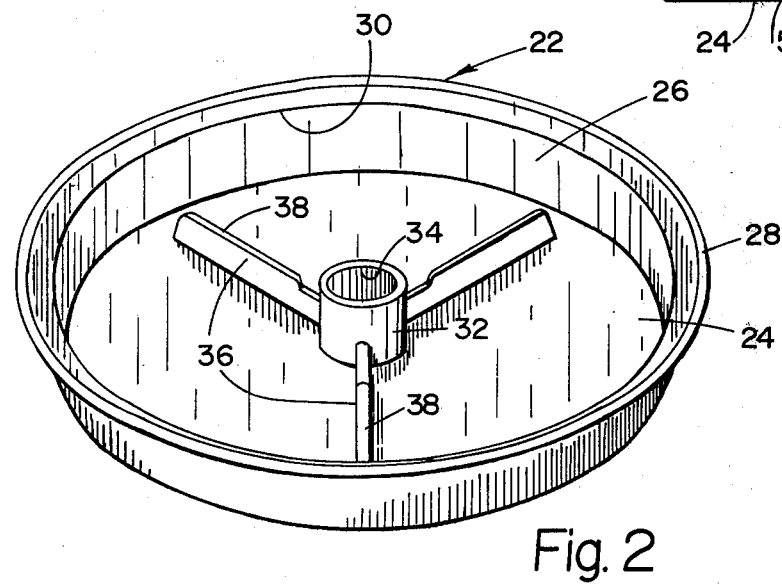
Fig. 1
Fig. 2

COMBINED PLANTER RECEPTACLE AND PLANT SUPPORT

BACKGROUND OF THE INVENTION

This invention relates generally to plant husbandry, and more particularly to a novel device for holding a planter while providing both a reservoir for receiving excess water from the planter and an extendable plant support.

Many varieties of potted house plants tend to spread excessively or grow to a height which cannot be supported adequately by their roots and/or stalks. As a consequence, unless such plants are provided with some type of support, their appearance and health may be damaged by excessive spreading, drooping, stalk breakage, or the like.

In the past, the usual support for potted plants has taken the form of a dowell, stick, ruler, or the like, one end of which is simply pushed into the soil within the planter. Unfortunately, such supports have proven less than satisfactory. Even if pushed relatively deeply into the soil they are quite susceptible to dislodgment if inadvertently bumped or jarred, or if the plant becomes markedly one sided or top heavy. Particularly after being moistened, soil is realatively soft, and provides substantially reduced resistance to dislodgment and tipping of a heavily weighted plant support.

Also, the usual support is fixed in length. Thus, unless an unsightly long support is initially used in anticipation of the fully grown plant, it is necessary to disturb the soil and plant roots periodically in substituting successively longer supports to keep up with the plant growth.

Another problem connected with potted plants is in holding and disposing of excess liquid resulting from their watering. A shallow saucer, dish or similar container generally is placed under a planter to receive and hold excess water which would otherwise drain onto and rapidly stain and deteriorate any windowsill, table or other surface on which the planter might be placed. And while such containers have been used widely, frequently they have proven quite troublesome because of instability or sliding of the planter thereon, blockage of the planter drain, and limited fluid capacity leading to spills and overflowing.

These and other problems have been long recognized in the art, and various proposals have been made for their solution. Unfortunately, such prior proposals have met with little or no success. For instance, U.S. Pat. Nos. 291,569 and 3,447,263 teach the use of stakes which are extendable to compensate for plant growth, but such stakes are simply pushed into the soil and hence subject to dislodgment. Other proposals suggest an extendable plant support fixed to a mounting plate which is disposed within the planter under the soil, as illustrated in U.S. Pat. No. 3,471,968 and French Pat. No. 1,506,410. Such structures not only fail to provide an external reservoir for holding excess water, however, but they quite obviously would not be suitable for use with an already growing plant. The telescopic structure of U.S. Pat. No. 3,165,863 could be used with a growing plant, but here again dislodgment of the support would be a problem as would the retention of excess water.

Other proposals teach the use of saucers or similar receptacles for holding and feeding water to a potted plant, as represented by the following U.S. Patents:

3,769,748
2,691,245
2,504,031
2,206,694
1,928,810
616,968

Although such structures might be viewed as providing a reservoir capable of receiving and holding excess water which might be poured directly into the soil in the planter, they do not suggest any type of plant support.

U.S. Pat. No. 3,739,523 teaches a disc adapted to be placed under a planter and provided with a vertically positioned, hollow apertured rod containing a capillary wick material through which water is transferred between a separate saucer-like container and the soil within the planter. A plant support is shown as being attached to the upper end of the vertical rod. This prior device, however, does not provide for an extendable plant support, a support which is adapted to be inserted downwardly through the soil to minimize disturbance to the roots of the plants therein, a support which is selectively separable from the base or reservoir container, spacing of the planter above the bottom wall of the reservoir to provide free drainage and substantial reservoir capacity, nor other features representing adequate solutions to the problems discussed heretofore.

Accordingly, in spite of past attempts, the plant husbandry field has not succeeded in developing a simple, inexpensive, rugged, efficient and convenient combination planter receptacle/reservoir and plant support device.

SUMMARY OF THE INVENTION

This invention provides a device adapted for use with a planter or flower pot of the type having a centrally located bottom drain. It includes a generally dish-shaped base forming an upwardly open reservoir in which the bottom of the planter is placed. Extending upwardly from the bottom of the reservoir is a centrally located socket sized to freely enter but not close the planter drain. Radiating outwardly from the socket are a plurality of ribs which not only buttress the socket and reinforce the base but form a seat for holding the planter in a substantial spaced relation with the bottom wall of the reservoir. A relatively rigid, elongate plant support is releasably connected to and held in a vertical position by the socket, the support extending upwardly through the planter and being selectively variable in height as may be required by plant growth.

Should the planter contain soil and a rooted plant at the time of its assembly with a device embodying the present invention, the plant support may be pushed or driven downwardly through the soil into engagement with the socket, thereby causing little or no significant disturbance of the soil or plant roots. Thereafter, in the event excess water should be used in watering the plant, such water will filter through the soil to the bottom of the planter and freely run into the reservoir of the base through the space in the drain around the socket. As the planter is spaced above the bottom of the base, it displaces little of the effective storage volume of the reservoir. Thus, the danger of overflow from the reservoir is slight. Also, the assembled base and planter may be handled and moved without danger of shifting or sliding because of the stabilizing effect of the socket/drain engagement.

Accordingly, it is an object of the present invention to provide an improved plant support and water retention device for use with potted plants.

Another object of this invention is the provision of a device for use with potted plants, the device including a selectively extendable plant support which is releasably maintained against tilting by a reservoir base disposed below the planter.

Yet another object of this invention is to provide a device for use with a planter having a bottom drain, the device including a base having a reservoir for receiving water from the planter and an elongate plant support releasably connected with the base through the drain.

A still further object of this invention is the provision of a device for holding a planter with a centrally located bottom drain, the device including a generally dish-shaped molded base having a reservoir for receiving water from the planter and a socket centrally disposed in the reservoir and adapted to extend into the planter drain for releasable engagement with a plant support.

Another object of this invention is to provide a combined planter receptacle and plant support device adapted for use with a planter having soil and a rooted plant therein.

Still further, it is an object of this invention to provide a combined planter receptacle and plant support device which can be constructed inexpensively yet ruggedly and which is simple and convenient yet effective in use.

Yet additional objects and features of this invention will be apparent from the following specification and claims when considered in connection with the appended drawings.

DESCRIPTION OF THE DRAWINGS

FIG. 1 is a cross sectional view showing a combined planter receptacle and plant support device according to the present invention as its appears when assembled with a typical flower pot or planter;

FIG. 2 is a perspective view of the base portion of the device of FIG. 1;

FIG. 3 is a fragmentary enlarged view, partially in cross section, showing the coupling sleeve used to connect contiguous sections of the plant support of FIG. 1; and FIG. 4 is a fragmentary view, partially in cross section, showing a modified socket utilizing a coupling sleeve of the type employed to couple the plant support sections of the embodiment of FIG. 1.

DESCRIPTION OF THE PREFERRED EMBODIMENT

Referring first to FIG. 1, the preferred embodiment of the present invention is shown as being assembled with a typical planter or flower pot 10 of a well known type. Such a planter generally is formed of clay or similar ceramic material, and provided in its lower surface 12 with a centrally located circular drain 14. Disposed within the planter 10 is a quantity of growing medium or soil 16 suitable for rooting and growing a plant (not illustrated).

The preferred embodiment or device 20 includes a base 22 preferably molded of a high impact synthetic resin or plastic material of a type which is dimensionally stable and substantially inert to water and such plant nutrients and chemicals as might be found in soil used in flower pot. As will be readily understood by those in the art, for reasons of economy, the base 22 should have an attractive finish as molded to eliminate the expense and inconvenience of subsequent finishing operations.

The base 22 preferably is generally dish-shaped or circular in configuration, comprising a bottom wall 24 and an integral upwardly projecting side wall 26. The side wall 26 flares somewhat outwardly from the periphery of bottom wall 24, and terminates in a flange or lip 28. As will be best seen from FIG. 2, the bottom and side walls 24 and 26 thus define a liquid reservoir having an upwardly facing opening 30.

The diameter of the base 22 and hence the size of the upwardly facing opening 30 desirably should be chosen to accommodate various sizes of planters 10. For this purpose, a bottom wall of about 6⅝ inches has been found suitable.

A socket 32 is provided in the reservoir of base 22, this socket preferably taking the form of a substantially cylindrical body disposed centrally of and molded integrally with bottom wall 24. The height of socket 32 is somewhat less than that of side wall 26, with its diameter being somewhat less than that of drain 14. Accordingly, when planter 10 is disposed on base 22 as illustrated in FIG. 1, socket 32 will freely enter drain 14 and act as a centering device to maintain planter 10 and base 22 in substantial axial alignment.

Formed in socket 32 is an upwardly open bore which defines a vertically disposed cylindrical surface 34. The purpose of this bore will be explained in greater detail hereinafter.

Molded integrally with bottom wall 24 is a plurality of upwardly projecting support ribs 36, which are spaced radially from one another around the socket 32. Preferably, three ribs 36 are provided, each rib being spaced about 120° from adjacent ribs. As will be best seen from FIG. 2, ribs 36 are equal in height and configuration, connecting at their inner ends to socket 32 and providing upper edge surfaces 38 which are coplanar and cooperatively form a horizontal seat adapted to receive and support the lower surface of planter 10 in a spaced relation with bottom wall 24.

Socket 32 preferably is of somewhat greater height than upper edge surfaces 38, and accordingly will extend into drain 14 for the purpose described hereinabove. The lower surface of bottom wall 24 of base 22 may be provided with a plurality of projections or feet 40 to stabilize base 22 on and insure the circulation of air between the windowsill, table or other surface on which the base may be placed.

Frictionally engaged with cylindrical surface 34 of socket 32 is the lower end of an elongate, plant support 42. As will be seen best from FIG. 1, plant support 42 extends vertically from socket 32 through soil 16 to a position above the upper edge of planter 10. As will be obvious to those in the plant husbandry field, the upper end of plant support 42 is to be used for supporting the plant (not shown) rooted in soil 16, as by tying, etc.

In the event the device of this invention is to be used with an existing rooted or potted plant, obviously any unnecessary disturbance of the soil 16 and plant roots should be avoided. It may be desirable, therefore, to point the lower end 44 of plant support 42 to assist in its penetration vertically down through soil 16 and into engagement with the connecting means defined by the previously described cylindrical surface 34 of socket 32. Should the planter 10 initially be empty, of course, it may simply be placed on the base 22 and the plant support inserted into socket 32 before being filled with soil and a plant rooted therein.

Depending upon the rigidity of the material used in molding base 22 and/or fabricating the sections of 46 of plant support 42, and the tolerances held, it may be desirable to form shallow splines, or the like, on the cylindrical surface 34 to insure a good frictional sliding fit of the plant support 42 in socket 32. In any event, however, the fit is to be such that socket 32 will maintain plant support 42 in its vertical position against the transverse forces which may result from tying thereto plants which are top heavy or off center in weight distribution.

As plant support 42 may be used with any one of a variety of planter sizes and/or with numerous types of plants, it is manually or selectively extendable to different heights above planter 10. In the illustrated embodiment, this extendable feature is provided by use of at least two support sections 46, to which additional sections may be added as required. These sections may be made of a variety of materials, but it is presently preferred to use a relatively rigid wood doweling of about ⅜ inch diameter. Because it may be exposed to damp soil for long periods of time, at least the lower section preferably may be treated with a preservative of a type well known in the art.

As best illustrated in FIG. 3, the ends of contiguous sections 46 are releasably coupled together by means of a substantially cylindrical plastic or metal sleeve 48 having an axial bore 50 opening through each end thereof. As in the case of the bore 34 in socket 32, the bores 50 of sleeve 48 should be sized to provide a snug, frictionally sliding fit with the ends of sections 46.

To insure proper positioning of sleeve 48 on contiguous ends of sections 46, there is provided an internal stop member 52 intermediate the ends of sleeve 48. This stop member, of course, will prevent inadvertent axial movement of sleeve 48 relative to sections 46 thereby assuring against possible tilting of one or more of these sections.

It will be understood, of course, that other types of extendable plant support structures may be used in this embodiment. For example, Duran U.S. Pat. No. 3,165,863 illustrates a telescopically extendable support of a type which could be used readily with base 22.

In using the embodiment or device or FIGS. 1–3, an empty planter 10 would simply be placed on base 22, with the socket 32 extending into drain 14. Thereafter, the plant support 42 should be inserted vertically through the open upper end of the planter and into engagement with socket 32. Subsequently, soil may be placed in the planter, and a suitable plant rooted therein. Dependng upon the eventual growth of the plant, the plant support may be extended either by adding one or more sections as explained above, or by manually extending telescoping sections.

In the event the device is to be used with a previously filled planter, the same procedure would be employed, as described above, except that the plant support should simply be pushed through the soil 16 and into engagement with socket 32.

Watering of the potted plant contained in planter 10 would be accomplished simply by pouring a quantity of water into the soil 16 through the open upper end of the planter 10. In the event of excess water, such excess will filter through the soil and through drain 14 around socket 32 and into the reservoir defined in base 22. Since the planter 10 is spaced a relatively substantial distance above bottom wall of base 22 by ribs 36, little of the reservoir volume is lost as a result of displacement by the lower portion of planter 10. Thus, the base 22 will hold considerable more water than the usual saucer or plate. Further, as drain 14 is spaced from any obstruction, there is no danger of it becoming blocked or clogged, as happens occasionally when a planter is placed on a relatively flat plate or saucer.

Turning now to the modification illustrated in FIG. 4, all elements shown therein are identical to and identified the same as those of the embodiment of FIGS. 1–3, except for the socket. In this embodiment, an upwardly projecting circular finger 100 is molded integral with bottom wall 24 and support ribs 36. Frictionally retained on this finger 100 is a coupling member which is identical to the coupling 48 described previously in connection with the plant support 42. As will be noted, one end of the coupling 48 is positioned over finger 100, and the other end is thus open to serve as a socket for receiving and supporting the lower end of plant support section 46. A longitudinally extending slot 102 is formed in finger 100 to provide sufficient circumferential resiliency to accomodate slight variations in the diameter of bore 50 of sleeve 48.

It is to be understood that although the preceding description and appended drawings are relatively detailed, they are for the purpose of illustrating and not limiting the present invention, the scope of which is to be defined by the following claims.

I claim:

1. A plant husbandry device for use in combination with a planter having a bottom portion terminating in a substantially planar lower surface which is provided with a centrally disposed drain, said device comprising
    A. a base having
        i. a generally planar horizontal bottom wall,
        ii. a side wall extending around the periphery of and projecting upwardly from said bottom wall to define therewith a liquid reservoir having an upwardly facing opening sized to freely receive said bottom portion,
        iii. a socket integral with and projecting upwardly from said bottom wall generally centrally of said reservoir, said socket being smaller in cross section than and sized to freely enter said drain without obstruction thereof,
        iv. a plurality of relatively narrow support ribs integral with and reinforcing said bottom wall and projecting upwardly therefrom to a height less than that of said socket, the inner end of each of said ribs being reduced in height relative to the outer ends and integrally connected to and buttressing said socket, said ribs being spaced from one another radially around said socket and the outer ends of said rib terminating in coplanar upper edge surfaces radially spaced from said socket which cooperatively form a generally horizontal discontinuous seat and said inner ends forming a relieved portion under said planter drain.
    B. when said bottom portion of said planter is disposed within said reservoir
        i. said seat receiving and supporting said bottom surface in a spaced relation with said bottom wall without obstruction of said drain,
        ii. said socket entering said drain, and iii. the interior of said planter freely communicating with said reservoir through said drain externally of said socket between said ribs, C. a manually extendable elongate plant support aligned with said socket and extending through said planter in a generally perpendicular relationship with said bottom wall, D. means for releasably connecting said socket and said plant support and restraining said plant support against tilting from its said perpendicular position under the influence of transversely applied pressure thereon.

2. A device according to claim 1, characterized by the feature that said socket comprises a substantially cylindrical body disposed in a perpendicular relationship with said bottom wall.

3. A device according to claim 2, characterized by
A. said base comprising a unitary casting of synthetic resin of a type which is relatively impervious and inert to water and dissolved plant nutrients,
B. said plant support is composed of relatively rigid wood sections, and
C. the length of said ribs being less than the distance between said cylindrical body and said side wall whereby free liquid communication is provided throughout said reservoir.

4. A device according to claim 2, characterized by said connecting means comprising a cylindrical surface coaxial with and provided by said cylindrical body and sized to slidingly engage one end of said plant support.

5. A device according to claim 4, characterized by the feature that said cylindrical surface is defined by an upwardly open bore.

6. A device according to claim 5, characterized by said elongate plant support comprising
A. at least two axially aligned cylindrical rod-like sections,
B. means for releasably coupling contiguous sections, whereby the length of said plant support is selectively variable, said coupling means comprising a substantially cylindrical sleeve having a coaxial bore sized to telescopically receive and frictionally retain adjacent ends of said contiguous sections, and
C. stop means within said bore intermediate the ends thereof for limiting said telescopic movement of said sleeve relative to said ends of said contiguous sections.

* * * * *